United States Patent
Hirose et al.

(10) Patent No.: US 6,926,881 B2
(45) Date of Patent: Aug. 9, 2005

(54) PROCESS FOR PRODUCING HYDROGEN-CONTAINING GAS

(75) Inventors: Shigeyuki Hirose, Niigata (JP); Futoshi Ikoma, Niigata (JP); Masayuki Katagiri, Niigata (JP); Koki Takamura, Niigata (JP); Yasushi Hiramatsu, Niigata (JP); Mikio Yoneoka, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 251 days.

(21) Appl. No.: 10/294,590

(22) Filed: Nov. 15, 2002

(65) Prior Publication Data

US 2003/0095919 A1 May 22, 2003

(30) Foreign Application Priority Data

| Nov. 20, 2001 | (JP) | ..................................... 2001-354729 |
| Nov. 22, 2001 | (JP) | ..................................... 2001-357304 |
| Nov. 28, 2001 | (JP) | ..................................... 2001-362284 |

(51) Int. Cl.$^7$ ................................................. C01B 3/26
(52) U.S. Cl. .................................... 423/648.1; 252/373
(58) Field of Search ......................... 423/648.1; 252/373

(56) References Cited

U.S. PATENT DOCUMENTS

2001/0016188 A1    8/2001    Haga et al.

FOREIGN PATENT DOCUMENTS

| JP | 60-82137      |   | 5/1985 |            |
| JP | 60137434  A   | * | 7/1985 | ............ B01J/23/64 |
| JP | 2001-25662    |   | 1/2001 |            |
| JP | 2001-185190   |   | 7/2001 |            |
| JP | 2001185190 A  | * | 7/2001 | ............ H01M/8/06 |

OTHER PUBLICATIONS

Communication and European Search Report mailed Mar. 4, 2004, for EP 02 02 5358.
N. Iwasa, et al., "Steam Reforming of Methanol Over Ni, Co, Pd and Pt Supported on ZnO", React. Kinet. Catal. Lett., vol. 55, No. 2, pp. 349–353, 1995.
N. Iwasa, et al., "New catalytic functions of Pd–Zn, Pd–Ga, Pd–In, Pt–Zn, Pt–Ga and Pt–In alloys in the conversions of methanol", Catalysis Letters, vol. 54, No. 3, pp. 119–123, 1998.

* cited by examiner

Primary Examiner—Stanley S. Silverman
Assistant Examiner—Maribel Medina
(74) Attorney, Agent, or Firm—Antonelli, Terry, Stout & Kraus, LLP

(57) ABSTRACT

There is disclosed a process for producing a hydrogen-containing gas, which comprises reacting methanol, steam and oxygen in the presence of (1) a catalyst comprising platinum and zinc oxide, wherein the content of the platinum is in the range of 5 to 50% by weight based on the total amount of the platinum and zinc oxide, or (2) a catalyst comprising platinum, zinc oxide and chromium oxide, wherein the atomic ratio of zinc to chromium (zinc/chromium) is in the range of 2 to 30, or (3) a catalyst comprising platinum, zinc oxide and at least one element selected from the group consisting of lead, bismuth and indium. Each of the catalysts has a high activity and is excellent in heat resistance and selectivity to steam-reforming reaction, and accordingly is capable of efficiently producing a reformed gas which is composed principally of hydrogen and is well suited for use in a fuel cell and the like by means of auto thermal reaction reaction, while lowering the concentration of carbon monoxide in a reformed hydrogen-containing gas.

18 Claims, No Drawings

PROCESS FOR PRODUCING HYDROGEN-CONTAINING GAS

BACKGROUND OF THE INVENTION

1. Field of the Invention

The present invention relates to a process for producing a hydrogen-containing gas by means of steam-reforming reaction of methanol. More particularly, the present invention pertains to a process for producing a hydrogen-containing gas which comprises subjecting methanol to steam-reforming reaction through a auto thermal reaction in the presence of oxygen.

2. Description of the Related Arts

It has hitherto been well known that methanol is reformed into a hydrogen-containing gas in the presence of a catalyst in a comparatively easy manner. In particular, methanol, which is reformed by reaction with steam into a hydrogen-containing gas having a low concentration of carbon monoxide which is difficult to separate, has recently become a center of attraction as a simple convenient supply source of hydrogen which is expected to expand its demand in the near future.

In addition, since a fuel cell, especially that which is employed for automobiles is called upon to be miniatured and simplified in its structure, development is set forward on a reactor of a auto thermal reaction in which reaction heat necessary for steam-reforming reaction is supplied by the heat of combustion through the introduction of air into the reactor.

The above-mentioned steam-reforming reaction of methanol in which methanol is reformed into a hydrogen-containing gas by the use of steam is constituted of the principal reaction as represented by the chemical equation (1) and besides the reverse shift reaction by producing a small amount of carbon monoxide as represented by the chemical equation (2).

$$CH_3OH+H_2O=3H_2+CO_2+49.5 \text{ kJ/mol} \quad (1)$$

$$CO_2+H_2=CO+H_2O+41.17 \text{ kJ/mol} \quad (2)$$

The amount of the carbon monoxide which is by produced in the chemical equation (2) is preferably as small as possible, but the carbon monoxide is difficult to remove in the case of purifying into highly pure hydrogen. From the aspect of thermodynamic equilibrium, the concentration of carbon monoxide in the reformed gas can be lowered with lowering in the reaction temperature and with an increase in the molar ratio of steam to methanol (hereinafter referred to as "S/C ratio").

The principal reaction of the steam-reforming reaction of methanol as represented by the chemical equation (1) is an endothermic reaction, to which heat must be supplied from the outside of the reaction system, and accordingly suffers from such disadvantages that heat supply equipment is made necessary and thus the production unit becomes intricate and troublesome. There is available against an auto thermal reaction in which air is introduced in the reaction system along with methanol and steam so as to oxidize part of methanol, and the resultant reaction heat is utilized to cause the steam-reforming reaction of methanol as represented by the chemical equation (1) to take place. In the above-mentioned process, part of methanol is oxidized into hydrogen and carbon dioxide as represented by the chemical equation (3) so that the resultant reaction heat is utilized to proceed with the steam-reforming reaction of methanol as represented by the chemical equation (1).

$$CH_3OH+\tfrac{1}{2}O_2=2H_2+CO_2-192.3 \text{ kJ/mol} \quad (3)$$

The aforesaid process is characterized in that heat supply is needed until the reaction temperature reaches a level necessary for commencing the reaction, but is not needed when the reaction is once continued.

A number of proposals have been made on a catalyst to be employed in the steam-reforming reaction of methanol, including the catalyst on which are supported a base metal element such as copper, nickel, chromium, zinc and aluminum and the oxide or the like thereof, and the catalyst on which a platinum series metal such as platinum and palladium is supported on a carrier such as alumina. For instance, there are proposed the catalyst comprising a platinum series metal as an active ingredient in Japanese Patent Application Laid-Open No. 1742371/1983 (Showa 58) and the like, and the catalyst comprising nickel as a principal ingredient in Japanese Patent Application Laid-Open No. 49204/1975 (Showa 50) and the like.

However, in the presence of a catalyst comprising such a metal other than copper as a platinum series metal and nickel, a methanol decomposing reaction predominantly proceeds according to the chemical equation: $CH_3OH \rightarrow CO+2H_2$, thereby bringing about the drawback in that the above-mentioned catalyst is ineffective from the aspect of producing hydrogen.

That is to say, the catalyst effectively proceeding with the reaction: $CH_3OH+H_2O \rightarrow CO_2+3H_2$ which is advantageous for effective production of hydrogen from methanol has heretofore been restricted to a catalyst comprising copper as an principal ingredient. As a catalyst comprising copper as a fundamental ingredient, there are proposed the catalyst which comprises copper, zinc and aluminum and the like catalyst {refer to Japanese Patent Publication No. 177/1995 (Heisei 7)}.

Nevertheless, the catalyst comprising copper as a fundamental ingredient suffers from such shortcomings as poor heat resistance at a high temperature of about 250° C. and higher and generation of sintering for copper and/or zinc as catalyst components during a long time service, thus causing deterioration in catalytic activity in a short period of time.

On the contrary, there are proposed the palladium-zinc oxide catalyst {Japanese Patent Application Laid-Open No. 49930/1993 (Heisei 5)}, platinum-zinc oxide catalyst {Japanese Patent Application Laid-Open No. 25662/2001 (Heisei 13)} and the like catalysts.

However, mention is made of high selectivity to steam-reforming reaction, that is, low selectivity to carbon monoxide in the reformed gas, but nothing is mentioned about sufficient heat resistance and durability on the above-mentioned Japanese Patent Application Laid-Open No. 49930/1993 (Heisei 5). The use of the platinum-zinc oxide catalyst {Japanese Patent Application Laid-Open No. 25662/2001 (Heisei 13)} brings about selectivity to carbon monoxide higher than that when use is made of the palladium-zinc oxide catalyst and besides, nothing is mentioned about sufficient heat resistance and durability thereon. Moreover, the aforesaid platinum-zinc oxide catalyst needs to be subjected to a reduction treatment with hydrogen at 200° C. outside of the furnace in the reaction system, and thus it is problematical under the aspect of maintenance when mounted on a portable methanol reforming apparatus such as on an automobile.

Further, the catalysts disclosed therein is concerned with the steam-reforming reaction of methanol without referring to the auto thermal reaction reaction.

In a reactor of the auto thermal reaction, part of methanol is oxidized, so that the portion where oxidative reaction takes place is brought to a high temperature as compared with the steam-reforming reaction, and thereby a catalyst having further high heat resistance is required.

Depending upon the type of a fuel cell, for instance, in the case of a polymer electrolyte fuel cell, an electrode catalyst is generally deteriorated by carbon monoxide in a definite concentration or higher and therefore, it is necessary to lower the carbon monoxide concentration to the extent that the electrode catalyst is not affected thereby through any possible means prior to the introduction of fuel gas in the fuel cell. In many cases carbon monoxide concentration is lowered to an order of ppm through the selective oxidative reaction, whereas limitations are put on a mounting capacity in vehicle mounting application. Thus in order to miniaturize a selective oxidative reaction unit for carbon monoxide, the amount of carbon monoxide to be treated is preferably as small as possible and at the same time, the concentration of carbon monoxide in a hydrogen-containing gas coming from a reforming unit is preferably as low as possible. In the case of a high carbon monoxide concentration, it is made necessary to separately equip an apparatus for lowering the concentration by means of water-gas shift reaction or the like, thus bringing about disadvantages in vehicle mounting application wherein limitations are put on a mounting capacity. Further in such application, a catalyst having high activity is called upon in order to miniaturize a reforming reactor according to the limitations on the mounting capacity.

Under such circumstances, the object of the present invention is to provide a process for producing a gas comprising hydrogen as the principal ingredient by means of a auto thermal reaction reactor in an industrially advantageous manner by developing a methanol reforming catalyst having a high activity, high heat resistance and high selectivity to steam-reforming reaction.

Other objects of the present invention will become obvious from the text of this specification hereinafter disclosed.

SUMMARY OF THE INVENTION

As a result of intensive extensive research and investigation accumulated by the present inventors in order to achieve the objects as mentioned before, it has been found that (1) a catalyst which comprises platinum in a specific amount and zinc oxide as principal ingredients is well suited to auto thermal reaction; (2) a catalyst which comprises platinum, zinc oxide and chromium oxide as principal ingredients and has a specific zinc/chromium ratio is well suited to auto thermal reaction, and also lessens the concentration of carbon monoxide in a hydrogen-containing gas to be obtained; and (3) by the use of a catalyst which comprises platinum, zinc oxide and at least one element selected from the group consisting of lead, bismuth and indium, it is made possible to impart high heat resistance to itself and to improve the selectivity to steam-reforming reaction as compared with a catalyst composed of platinum and zinc oxide as principal ingredients, that is, to lower the selectivity to carbon monoxide and at the same time, the above-mentioned catalyst is preferably usable for a auto thermal reaction reformer. The present invention has been accomplished by the above-mentioned findings and information.

That is to say, the present invention provides processes each for producing a hydrogen-containing gas as described hereunder.

(a) a process for producing a hydrogen-containing gas, which comprises reacting methanol, steam and oxygen in the presence of a catalyst comprising platinum and zinc oxide, wherein the proportion of the platinum is in the range of 5 to 50% by weight based on the total amount of the platinum and zinc oxide;

(b) a process for producing a hydrogen-containing gas according to the preceding item (a), which comprises reacting methanol, steam and oxygen in the presence of a catalyst comprising platinum, zinc oxide and chromium oxide, wherein the atomic ratio of zinc to chromium (zinc/chromium) is in the range of 2 to 30; (c) a process for producing a hydrogen-containing gas according to the preceding item (a), which comprises reacting methanol, steam and oxygen in the presence of a catalyst comprising platinum, zinc oxide and at least one element selected from the group consisting of lead, bismuth and indium.

DESCRIPTION OF THE PREFERRED EMBODIMENTS

Zinc oxide available on the market is usable as zinc oxide for the catalyst to be used in the process for producing a hydrogen-containing gas according to the present invention. In addition, there are also usable as a zinc source, such zinc compounds that form zinc oxide after calcining or reducing or during reaction, including a salt of an organic acid or an inorganic acid such as zinc acetate and zinc nitrate, zinc oxide, zinc hydroxide and basic zinc carbonate.

The raw material for platinum is not specifically limited, but preferably is selected for use from platinum oxide, chloroplatinic acid, an alkali metal salt thereof, acetylacetonato platinum, diamminedinitroplatinum and the like. In the case of preparing a catalyst by dissolving in water, it is preferable to employ potassium chloroplatinate.

The source of chromium is not specifically limited provided that it can be made into chromium oxide upon completion of catalyst preparation. There is usable as the source of chromium, for instance, a water-soluble salt of an organic acid or an inorganic acid such as chromium acetate and chromium nitrate. In this case, chromium oxide is obtainable by calcining the precipitate obtained by treating with a precipitant, an aqueous solution of the above-cited chromium compound.

There are usable, as the raw material for lead, lead oxide, lead acetate, lead oxalate, lead nitrate, basic lead carbonate, basic lead acetate and the like.

There are usable, as the raw material for bismuth, basic bismuth carbonate, bismuth nitrate, basic bismuth nitrate, acetic acid bismuth oxide, bismuth oxalate and the like.

There are usable, as the raw material for indium, indium oxide, indium nitrate, indium acetate, acetylacetonato indium and the like.

A method for preparing the catalyst in the process (a) is not specifically limited provided that the method allows the platinum and zinc oxide to coexist. There are available a method (coprecipitation method) comprising simultaneously forming a precipitate from the mixed solution of a water-soluble zinc compound and a platinum compound along with a precipitant; a method comprising mixing the slurry in which zinc oxide or zinc hydroxide or basic zinc carbonate is dispersed with a solution of a platinum compound, and adding a precipitant or a reducing agent to the resultant mixture to deposit platinum components; and a method comprising impregnating a platinum compound into zinc oxide or zinc hydroxide or basic zinc carbonate; and the like methods.

The content of the platinum which is contained in the catalyst is in the range of 5 to 50%, preferably 20 to 30% by weight based on the total amount of the platinum and zinc oxide. The platinum-zinc oxide catalyst which has a platinum content in the above-mentioned range is excellent in catalytic activity, selectivity and heat resistance particularly in auto thermal reaction wherein reforming reaction is put into practice in the presence of oxygen. The content of the platinum, when being less than 5% by weight based thereon, leads to insufficiency in platinum amount for the purpose of enhancing catalytic activity and selectivity, whereas the content, when being more than 50% by weight, gives rise to difficulty in causing zinc oxide carrier to support the platinum.

A method for preparing the catalyst in the process (b) is not specifically limited provided that the method allows the platinum, zinc oxide and chromium oxide to coexist. There are available for instance, a method comprising coprecipitating the mixed solution of potassium chloroplatinate, zinc nitrate and chromium nitrate by the use of a proper precipitant; a method comprising supporting potassium chloroplatinate on calcined powders of zinc oxide and chromium oxide which have been prepared by coprecipitating zinc nitrate and chromium nitrate; and the like methods.

The atomic ratio of zinc to chromium each being contained in the catalyst (zinc/chromium) is in the range of 2 to 30, preferably 2.3 to 10. By regulating the atomic ratio of zinc to chromium each being contained in the catalyst (zinc/chromium) to the above-specified range, it is made possible to minimize the concentration of carbon monoxide in a hydrogen-containing gas in the process for producing a hydrogen-containing gas which generates a reformed gas composed principally of hydrogen by means of steam-reforming reaction of methanol in particular, auto thermal reaction in which the reforming reaction is carried out in the presence of oxygen.

The content of the platinum which is contained in the catalyst is the same as in the process (a).

A method for preparing the catalyst in the process (c) is not specifically limited provided that at least one element selected from the group consisting of lead, bismuth and indium is incorporated in the catalyst components, in addition to platinum and zinc oxide. In the case where platinum, zinc oxide and lead coexist, there are available for instance, a method (1) comprising adding a precipitant to an aqueous solution of zinc nitrate and lead nitrate to form a precipitate, washing the resultant precipitate with distilled water or ion-exchanged water, drying or drying/calcining the washed precipitate to form a zinc-lead compound, crushing and dispersing the compound in water to form aqueous slurry, mixing the slurry and a solution of a platinum compound, and adding a precipitant or a reducing agent to the resultant mixture to deposit the platinum component; a method (2) comprising mixing the slurry of zinc oxide, zinc hydroxide or basic zinc carbonate with a solution of a platinum compound, adding a precipitant or a reducing agent to the resultant mixture to deposit the platinum component, drying or drying/calcining the mixture to obtain platinum-zinc compound, crushing and dispersing the same into water to form slurry, mixing the resultant slurry with a solution of a lead compound, and adding a precipitant to the mixture thus formed to deposit the lead component; a method (3) comprising impregnating a platinum compound and a lead compound into zinc oxide or zinc hydroxide or basic zinc carbonate; and the like methods. In the case where platinum, zinc oxide and bismuth or indium coexist, the methods same as or similar to the foregoing are applicable thereto to prepare the catalyst.

In regard to the contents of lead, bismuth and indium that are contained in the catalyst based on the total number of the atoms of oxygen and metals which constituting the catalyst, there are contained lead atoms in 0.01 to 3.5%, preferably 0.02 to 2%, bismuth atoms in 0.01 to 10%, preferably 0.05 to 4% and indium atoms in 0.01 to 5%, preferably 0.02 to 2%. The content of platinum contained in the catalyst in the process (c) is the same as in the process (a).

As a precipitant to be used in the preparation of the catalyst, use is made of an alkali compound such as sodium hydroxide, potassium hydroxide, sodium carbonate, potassium carbonate, sodium hydrogencarbonate.

The amount of the precipitant to be used therein is one to 2 times, preferably 1.1 to 1.6 times the chemical equivalent weight. The temperature at the time of preparing a precipitate is 20 to 90° C., preferably 35 to 85° C. It is preferable to wash the precipitate obtained by precipitation method with ion-exchanged water, distilled water or the like.

The precipitate obtained by the above-mentioned method is dried or dried/calcined, crushed, uniformized in size or molded, and then put into service. It is also possible to use the product obtained by crushing the dried or dried/calcined slurry, suspending it in water, adding a binder such as alumina sol thereto at need, and supporting it on a carrier or a carrier structure. In this case it is possible to use the supported catalyst after drying and as such or after drying and calcining.

The drying temperature is preferably in the range of 50 to 150° C. The calcining method is not specifically limited. In general, an object to be calcined is allowed to stand in a calcining furnace, and calcined in air at a temperature in the range of 180 to 800° C., preferably 200 to 600° C., more preferably 350 to 450° C.

With regard to the auto thermal reaction wherein methanol, steam and air are reacted, an activation treatment may be carried out, for instance, with hydrogen and carbon monoxide-containing gas as is the case with the steam-reforming reaction. It is also possible to proceed with the reaction without such an activation treatment.

The reaction conditions in the case of reacting methanol, steam and air are selected such that the heat release due to the combustional reaction is well balanced with the heat absorption due to the methanol reforming reaction, and are exemplified by a molar ratio of steam to methanol being 1 to 10 mol, preferably 1 to 5 mol, more preferably 1 to 2 mol, a molar ratio of air to methanol being 0.3 to 5.0 mol, preferably 0.3 to 3.0 mol, liquid hourly space velocity (LHSV) of methanol per unit volume of catalyst (=methanol LHSV) being 0.1 to 100 $h^{-1}$, preferably 0.5 to 60 $h^{-1}$, reaction temperature being in the range of 150 to 600° C., preferably 200 to 500° C. and reaction pressure being in the range of atmospheric pressure to 0.5 MPa.

In summarizing the working effects and advantages of the production process according to the present invention, it is made possible through the process (a) by virtue of the use of the catalyst comprising platinum in a specific amount and zinc oxide as principal ingredients to produce a hydrogen-containing gas in an industrially advantageous manner by means of the auto thermal reaction wherein methanol is reacted with steam and oxygen so that a reformed gas composed principally of hydrogen is efficiently generated, thus lowering the concentration of carbon monoxide in the reformed gas.

In addition, by virtue of the use of the catalyst comprising platinum, zinc oxide and chromium oxide as principal ingredients in a specific zinc/chromium ratio in the process (b) and also by virtue of the use of the catalyst comprising platinum, zinc oxide and at least one element selected from the group consisting of lead, bismuth and indium in the process (c), it is also made possible to impart high heat resistance to the catalyst, enhance the selectivity to steam-reforming reaction, lower the selectivity to carbon monoxide and at the same time, produce a reformed hydrogen-containing gas which is advantageously usable as hydrogen for a fuel cell and the like.

In what follows, the present invention will be described in more detail with reference to comparative examples and working examples, which however shall never limit the present invention thereto.

In the following comparative examples and working examples, methanol conversion and selectivity to carbon monoxide were determined from the chemical composition of the gas at the outlet of the reactor.

Methanol conversion (%)=([CO]+[CO$_2$])/([CO]+[CO$_2$]+[CH$_3$OH])×100

Selectivity to carbon monoxide (%)=[CO]/([CO]+[CO$_2$])×100

In the formulae, [CO], [CO$_2$] and [CH$_3$OH] are molar concentration of CO, CO$_2$ and CH$_3$OH, respectively in the gas at the outlet of the reactor.

<Process (a)>
{Preparation of Catalyst}
Catalyst A-1

Powdery zinc oxide in an amount of 15 g was dispersed in 500 milliliter (mL) of ion-exchanged water, and the dispersion was adjusted to a temperature of 60° C. To the resultant dispersion was added solution adjusted to 60° C. of 3.54 g of potassium chloroplatinate (K$_2$PtCl$_4$) dissolved in 500 mL of ion-exchanged water. After 30 minutes, to the mixture was added 17 mL of 1 N aqueous solution of potassium hydroxide, and the mixture thus prepared was matured for 60 minutes, while maintaining the temperature at 60° C. Thereafter the matured mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain a catalyst of Pt/ZnO having a platinum content of 10% by weight. The resultant catalyst was wet milled, mixed with alumina sol to be made into slurry. Subsequently there were repeated the steps of immersing a honeycomb (400 cells/square inch) made of cordierite (cordierite porcelain) into the slurried catalyst, blowing off an excess amount and drying so that the catalyst was supported in a catalyst amount of 200 g/L on a dry base. It was designated as Catalyst A-1.

Catalyst B-1

In the same manner as in Catalyst A-1, a catalyst of Pt/ZnO having a platinum content of 20% by weight was prepared, and supported on a cordierite-made honeycomb (400 cells/square inch) so as to be supported in a catalyst amount 200 g/L on a dry base. It was designated as Catalyst B-1.

Catalyst C-1

In the same manner as in Catalyst A-1, a catalyst of Pt/ZnO having a platinum content of 30% by weight was prepared, and supported on a cordierite-made honeycomb (400 cells/square inch) so as to be supported in a catalyst amount 200 g/L on a dry base. It was designated as Catalyst C-1.

Catalyst D-1

In the same manner as in Catalyst A-1, a catalyst of Pt/ZnO having a platinum content of 50% by weight was prepared, and supported on a cordierite-made honeycomb (400 cells/square inch) so as to be supported in a catalyst amount 200 g/L on a dry base. It was designated as Catalyst D-1.

Catalyst E-1

Potassium carbonate in an amount of 39.23 g was dissolved in 500 mL of ion-exchanged water, and the solution was adjusted to a temperature of 60° C. To the resultant solution was gradually added a solution adjusted to 60° C. of 13.82 g of potassium chloroplatinate (K$_2$PtCl$_4$) and 55.38 g of zinc nitrate hexahydrate that were dissolved in 750 mL of ion-exchanged water. The mixed solution was matured for 60 minutes, while keeping the temperature at 60° C. Thereafter the matured mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain by coprecipitation method, a catalyst composed of Pt/ZnO having a platinum content of 30% by weight. In the same manner as in the Catalyst A-1, the resultant catalyst was supported on a cordierite-made honeycomb (400 cells/square inch) so as to be supported in a catalyst amount of 200 g/L on a dry base. It was designated as Catalyst E-1.

Catalyst F-1

In the same manner as in Catalyst A-1, a catalyst of Pt/ZnO having a platinum content of one % by weight was prepared, and supported on a cordierite-made honeycomb (400 cells/square inch) so as to be supported in a catalyst amount 200 g/L on a dry base. It was designated as Catalyst F-1.

Catalyst G-1

Ammonium hydrogencarbonate in an amount of 140.4 g and 1186 mL of ion-exchanged water were placed in a 5 liter round bottom flask to dissolve it, while adjusting the temperature to 40° C. To the resultant solution were added a solution which was formed by dissolving 389.94 g of 50% aqueous solution of copper nitrate in 1290 mL of ion-exchanged water and was adjusted to 40° C., and further slurry which was formed by dispersing 49.35 g of zinc oxide in 500 mL of ion-exchanged water. Simultaneously therewith carbon dioxide gas was blown into the flask at a rate of 6 liter/hour, and after one hour the flask was heated to 80° C. and maintained thereat for 30 minutes. The blowing of carbon dioxide gas was discontinued after the lapse of 2 hours, and the content therein was allowed to cool down to 60° C. to form mixed slurry, which was washed to obtain a cake. The resultant cake was kneaded with alumina sol (alumina content of 6.3 g), then dried at 80° C. to obtain a Cu/ZnO/Al$_2$O$_3$ catalyst comprising copper, zinc and aluminum as principal ingredients and having copper/zinc atomic ratio of 1.33. In the same manner as in the Catalyst A-1, the resultant catalyst was supported on a cordierite-made honeycomb (400 cells/square inch) so as to be supported in a catalyst amount of 200 g/L on a dry base. It was designated as Catalyst G-1.

Catalyst H-1

Powdery zinc oxide in an amount of 15 g was dispersed in 500 mL of ion-exchanged water, and the dispersion was adjusted to a temperature of 35° C. To the resultant dispersion was added a solution adjusted to 35° C. of 4.17 g of palladium nitrate dihydrate {Pd(NO$_3$)$_2$·2H$_2$O} dissolved in 500 mL of ion-exchanged water. To the mixture thus formed was added 35 mL of 1 N aqueous solution of potassium hydroxide, and the mixture thus prepared was continuously stirred for 60 minutes to form a precipitate. Thereafter the precipitate was filtered, washed with 4 liter of ion-exchanged water, dried for 15 hours at a temperature of 80°

C., and then was calcined at 380° C. for 2 hours in air to obtain a catalyst of Pd/ZnO having a palladium content of 10% by weight. In the same manner as in the Catalyst A-1, the resultant catalyst was supported on a cordierite-made honeycomb (400 cells/square inch) so as to be supported in a catalyst amount of 200 g/L on a dry base. It was designated as Catalyst H-1.

Catalyst I-1

The procedure in Catalyst C-1 was repeated to prepare a catalyst of Pt/Al$_2$O$_3$ having a platinum content of 30% by weight. In the same manner as in the Catalyst A-1, the resultant catalyst was supported on a cordierite-made honeycomb (400 cells/square inch) so as to be supported in a catalyst amount of 200 g/L on a dry base. It was designated as Catalyst I-1.

{Reforming Reaction}

EXAMPLES 1 TO 4 AND COMPARATIVE EXAMPLES 1 TO 2

An aqueous solution of methanol having a water/methanol ratio of 1.5 was introduced in an evaporator at a methanol LHSV of methanol 5 hr$^{-1}$. Air was mixed in evaporated water/methanol on the downstream side of the evaporator outlet, and the temperature in the introduction line leading to a catalyst bed was regulated so that the water/methanol was charged therein at 200° C. The reaction of water/methanol was controlled with an air rate so as to achieve a methanol LHSV of 15 hr$^{-1}$ and a catalyst bed inlet temperature of 350° C. The chemical composition of the gas after the reaction was analyzed by means of gas chromatography. The evaluation results are given in Table 1, including details of the catalyst used therefor, methanol conversion at a temperature of the inlet of catalyst bed being 350° C. and selectivity to CO.

TABLE 1

| | Type of Catalyst | Methanol Conversion (%) | Selectivity to CO (%) |
|---|---|---|---|
| Example 1 | Catalyst A-1 (10 wt % Pt—ZnO) | 87.8 | 14.5 |
| Example 2 | Catalyst B-1 (20 wt % Pt—ZnO) | 93.4 | 10.7 |
| Example 3 | Catalyst C-1 (30 wt % Pt—ZnO) | 95.8 | 9.3 |
| Example 4 | Catalyst D-1 (50 wt % Pt—ZnO) | 91.1 | 9.6 |
| Comparative Example 1 | Catalyst F-1 (1 wt % Pt—ZnO) | 20.2 | 26.7 |
| Comparative Example 2 | Catalyst I-1 (30 wt % Pt—Al$_2$O$_3$) | 78.2 | 59.7 |

{Remarks} methanol LHSV; 15 hr$^{-1}$, honeycomb height; 20 mm, catalyst bed inlet temperature; 350° C.

As can be seen from Table 1, Examples 1 to 4 in each of which use is made of the catalyst according to the present invention exhibit high methanol conversion, low selectivity to CO and enhanced selectivity to steam-reforming reaction at a catalyst bed inlet temperature of 350° C. as compared with Comparative Example 1, and Example 3 exhibits selectivity to steam-reforming reaction higher than that in Comparative Example 2.

EXAMPLES 5 TO 7 AND COMPARATIVE EXAMPLES 3 TO 4

An aqueous solution of methanol having a water/methanol ratio of 1.5 was introduced in an evaporator at a methanol LHSV of 5 hr$^{-1}$. Air was mixed in evaporated water/methanol on the downstream side of the evaporator outlet, and the temperature in the introduction line leading to a catalyst bed was regulated so that the water/methanol was charged therein at 200° C. The reaction of water/methanol was controlled with an air rate so as to achieve an LHSV of 15 hr$^{-1}$ and a catalyst bed inlet temperature of 400° C. The chemical composition of the gas after the reaction was analyzed by means of gas chromatography. The evaluation results are given in Table 2, including types of the catalyst used therefor, methanol conversion after each reaction time as described hereunder and selectivity to CO.

TABLE 2

| | Type of Catalyst | Methanol Conversion (%) | Selectivity to CO (%) | Reaction time (Hr) |
|---|---|---|---|---|
| Example 5 | Catalyst A-1 (10 wt % Pt—ZnO) | 98.2 → 98.3 | 13.8 → 12.3 | 100 |
| Example 6 | Catalyst C-1 (30 wt % Pt—ZnO) | 99.6 → 99.6 | 11.5 → 9.4 | 200 |
| Example 7 | Catalyst E-1 (30 wt % Pt—ZnO) | 99.1 → 99.5 | 9.5 → 8.5 | 200 |
| Comparative Example 3 | Catalyst G-1 (Cu—ZnO—Al$_2$O$_3$) | 94.3 → 85.7 | 4.6 → 3.1 | 50 |
| Comparative Example 4 | Catalyst H-1 (10 wt % Pd—ZnO) | 95.7 → 88.4 | 5.0 → 10.8 | 100 |

{Remarks} methanol LHSV; 15 hr$^{-1}$, Conversion and Selectivity on the left side of the arrow mark(→) each indicate the value in the initial stage and those on the right side thereof show the value after each reaction time.

As can be seen from Table 2, Examples 5 to 7 in each of which use is made of the catalyst according to the present invention exhibit superior heat resistance as compared with Cu—ZnO—Al$_2$O$_3$ catalyst in Comparative Example 3 and Pd/ZnO catalyst in Comparative Example 4 and besides, by increasing the platinum content in the catalyst it is made possible to suppress to a low level, the concentration of carbon monoxide in the objective hydrogen-containing gas.

EXAMPLE 8

An aqueous solution of methanol having a water/methanol ratio of 1.5 was introduced in an evaporator at a methanol LHSV of 5 hr$^{-1}$. Air was mixed in evaporated water/methanol on the downstream side of the evaporator outlet, and the temperature in the introduction line leading to a catalyst bed was regulated so that the water/methanol was charged therein at 200° C. The reaction of water/methanol was controlled with an air rate so as to achieve a methanol LHSV of 15 or 30 hr$^{-1}$ and a catalyst bed inlet temperature of 400° C. The chemical composition of the gas after the reaction was analyzed by means of gas chromatography. The evaluation results are given in Table 2, including type of the catalyst used therefor, methanol conversion and selectivity to CO each in the initial reaction stage and after the lapse of 100 hours for each of methanol LHSV of 15 or 30 hr$^{-1}$.

TABLE 3

| Type of Catalyst | LHSV of methanol | Methanol Conversion (%) | Selectivity to CO (%) |
|---|---|---|---|
| Example 8 Catalyst C-1 (30 wt % Pt—ZnO) | 15 hr⁻¹ | 99.6 → 99.7 | 11.5 → 9.3 |
| Catalyst C-1 (30 wt % Pt—ZnO) | 30 hr⁻¹ | 99.5 → 99.3 | 10.2 → 10.2 |

{Remarks}

Conversion and Selectivity on the left side of the arrow mark(→) each indicate the value in the initial stage and those on the right side thereof show the value after 100 hours of reaction time.

<Process (b)>

{Preparation of Catalyst}

Catalyst A-2

Sodium carbonate anhydride in an amount of 138 g and 1000 mL of ion-exchanged water were placed in a 5 liter round bottom flask to dissolve sodium carbonate, while adjusting the temperature to 60° C. To the resultant solution were added a solution adjusted to 60° C. of 238 g of zinc nitrate hexahydrate and 80 g of chromium nitrate nonahydrate that were dissolved in 800 mL of ion-exchanged water, while stirring for 30 minutes. The slurry thus prepared was filtered, and precipitate thus obtained was washed with 12 liter of ion-exchanged water, subsequently dried at 80° C., and thereafter calcined at 380° C. for 2 hours in air to obtain a catalyst of Zn—Cr having a zinc oxide/chromium oxide ratio of 4 expressed in terms of atomic ratio of zinc/chromium.

To 500 mL of a dispersion at 60° C. in which 15 g of powdery catalyst of Zn/Cr thus obtained was dispersed, was added an aqueous solution adjusted to 60° C. of 13.82 g of potassium chloroplatinate ($K_2PtCl_4$) dissolved in 500 mL of ion-exchanged water. After 30 minutes, to the mixture was added 66 mL of 1 N aqueous solution of potassium hydroxide, and the mixture thus prepared was stirred for 60 minutes at 60° C. Thereafter the stirred mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain a catalyst of Pt—Zn—Cr having atomic ratio Zn/Cr of 4 and a platinum content of 30% by weight. The resultant catalyst was wet milled, and mixed with alumina sol to be made into slurry. Subsequently there were repeated the steps of immersing a cordierite-made honeycomb (400 cells/square inch) into the slurried catalyst, blowing off an excess amount and drying so that the catalyst was supported in a catalyst amount of 200 g/L on a dry base. It was designated as Catalyst A-2.

Catalyst B-2

In the same manner as in Catalyst A-2, a catalyst of Pt—Zn—Cr having a zinc/chromium ratio of 4 and a platinum content of 35% by weight was prepared, and supported on a cordierite-made honeycomb (400 cells/square inch) so as to be supported in a catalyst amount 200 g/L on a dry base. It was designated as Catalyst B-2.

Catalyst C-2

In the same manner as in Catalyst A-2, a catalyst of Pt—Zn—Cr having a zinc/chromium ratio of 2.33 and a platinum content of 35% by weight was prepared, and supported on a cordierite-made honeycomb (400 cells/square inch) so as to be supported in a catalyst amount of 200 g/L on a dry base. It was designated as Catalyst C-2.

Catalyst D-2

To 500 mL of a dispersion at 60° C. in which 15 g of powdery zinc oxide was dispersed, was added an aqueous solution at 60° C. of 13.82 g of potassium chloroplatinate ($K_2PtCl_4$) dissolved in 500 mL of ion-exchanged water. After 30 minutes, to the mixture was added 66 mL of 1 N aqueous solution of potassium hydroxide, and the mixture thus prepared was stirred for 60 minutes at 60° C. Thereafter the stirred mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain a catalyst of Pt—Zn having a platinum content of 30% by weight. In the same manner as in Catalyst A-2, the resultant catalyst was supported on a cordierite-made honeycomb (400 cells/square inch) so as to be supported in a catalyst amount 200 g/L on a dry base. It was designated as Catalyst D-2.

Catalyst E-2

Sodium carbonate anhydride in an amount of 128 g and 1000 mL of ion-exchanged water were placed in a 5 liter round bottom flask to dissolve sodium carbonate, while adjusting the temperature to 60° C. To the resultant solution was added a solution at 60° C. of 300 g of zinc nitrate hexahydrate dissolved in 800 mL of ion-exchanged water, while stirring for 30 minutes. The slurry thus prepared was filtered, and a precipitate thus obtained was washed with 12 liter of ion-exchanged water, subsequently dried at 80° C., and thereafter calcined at 380° C. for 2 hours in air to obtain a catalyst of zinc oxide.

To 500 mL of a dispersion at 60° C. in which 15 g of powdery zinc oxide thus obtained was dispersed, was added an aqueous solution adjusted to 60° C. of 17.37 g of potassium chloroplatinate ($K_2PtCl_4$) dissolved in 500 mL of ion-exchanged water. After 30 minutes, to the mixture was added 83 mL of 1 N aqueous solution of potassium hydroxide, and the mixture thus prepared was stirred for 60 minutes at 60° C. Thereafter the stirred mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain a catalyst of Pt/Zn having a platinum content of 35% by weight. In the same manner as in Catalyst A-2, the resultant catalyst was supported on a cordierite-made honeycomb (400 cells/square inch) so as to be supported in a catalyst amount of 200 g/L on a dry base. It was designated as Catalyst E-2.

Catalyst F-2

In the same manner as in Catalyst A-2, a catalyst of Pt—Zn—Cr having a zinc/chromium ratio of 1.5 and a platinum content of 35% by weight was prepared, and supported on a cordierite-made honeycomb (400 cells/square inch) so as to be supported in a catalyst amount of 200 g/L on a dry base. It was designated as Catalyst F-2.

EXAMPLE 9 AND REFERENCE EXAMPLE 1

An aqueous solution of methanol having a water/methanol ratio of 1.5 was introduced in an evaporator at a methanol LHSV of 5 hr⁻¹. Air was mixed in evaporated water/methanol on the downstream side of the evaporator outlet, and the temperature in the introduction line leading to a catalyst bed was regulated so that the water/methanol was charged therein at 200° C. The reaction of water/methanol in the presence of the catalyst A-2 or D-2 was controlled with an air rate so as to achieve a methanol LHSV of 15 hr⁻¹ and methanol conversion in the initial reaction stage of 99.5%.

The chemical composition of the gas after the reaction was analyzed by means of gas chromatography. The methanol conversion after a reaction time of 0 hour and 100 hours and air/methanol (A/M) ratio are given in Table 4, and selectivity to CO is given in Table 5.

TABLE 4

| | Type of Catalyst | Methanol conversion (%) | | A/M |
|---|---|---|---|---|
| | (LHSV = 15 hr$^{-1}$) | 0 hr | 100 hr | ratio |
| Example 9 | Catalyst A-2 (30 wt % Pt—Zn—Cr, Zn/Cr = 4) | 99.5 | 99.5 | 0.90 |
| Reference Example 1 | Catalyst D-2 (30 wt % Pt—Zn) | 99.6 | 99.6 | 0.96 |

TABLE 5

| | Type of Catalyst | Selectivity to CO (%) | |
|---|---|---|---|
| | (LHSV = 15 hr$^{-1}$) | 0 hr | 100 hr |
| Example 9 | Catalyst A-2 (30 wt % Pt—Zn—Cr, Zn/Cr = 4) | 8.4 | 8.2 |
| Reference Example 1 | Catalyst D-2 (30 wt % Pt—Zn) | 11.5 | 9.5 |

As can be seen from Table 4 and Table 5, Example 9 in which use is made of the catalyst in relation to the process (b) according to the present invention exhibits superior heat resistance, and thereby is capable of suppressing to a low level, CO concentration in the objective hydrogen-containing gas as compared with Reference Example 1 and also of decreasing A/M ratio, thus efficiently generating a reformed gas comprising hydrogen as the principal ingredient.

EXAMPLES 10 TO 11 AND REFERENCE EXAMPLES 2 TO 3

An aqueous solution of methanol having a water/methanol ratio of 1.5 was introduced in an evaporator at an methanol LHSV of 5 hr$^{-1}$. Air was mixed in evaporated water/methanol on the downstream side of the evaporator outlet, and the temperature in the introduction line leading to a catalyst bed was regulated so that the water/methanol was charged therein at 200° C. The reaction of water/methanol in the presence of the catalyst B-2, C-2, E-2 or F-2 was controlled with an air rate so as to achieve an methanol LHSV of 30 hr$^{-1}$ and methanol conversion in the initial reaction stage of 99.5%. The chemical composition of the gas after the reaction was analyzed by means of gas chromatography. The methanol conversion after a reaction time of 0 hour and 100 hours is given in Table 6, and selectivity to CO is given in Table 7.

TABLE 6

| | Type of Catalyst | Methanol conversion (%) | |
|---|---|---|---|
| | (LHSV = 30 hr$^{-1}$) | 0 hr | 100 hr |
| Example 10 | Catalyst B-2 (35 wt % Pt—Zn—Cr, Zn/Cr = 4) | 99.4 | 99.4 |
| Example 11 | Catalyst C-2 (35 wt % Pt—Zn—Cr, Zn/Cr = 2.33) | 99.2 | 99.2 |
| Reference Example 2 | Catalyst E-2 (35 wt % Pt/Zn) | 99.5 | 99.5 |
| Reference Example 3 | Catalyst F-2 (35 wt % Pt—Zn—Cr, Zn/Cr = 1.5) | 99.4 | 99.2 |

TABLE 7

| | Type of Catalyst | Selectivity to CO (%) | |
|---|---|---|---|
| | (LHSV = 30 hr) | 0 hr | 100 hr |
| Example 10 | Catalyst B-2 (35 wt % Pt—Zn—Cr, Zn/Cr = 4) | 9.7 | 9.6 |
| Example 11 | Catalyst C-2 (35 wt % Pt—Zn—Cr, Zn/Cr = 2.33) | 9.3 | 9.3 |
| Reference Example 2 | Catalyst E-2 (35 wt % Pt—Zn) | 12.0 | 11.5 |
| Reference Example 3 | Catalyst F-2 (35 wt % Pt—Zn—Cr, Zn/Cr = 1.5) | 12.0 | 12.3 |

As can be seen from Table 6 and Table 7, Examples 10 to 11 in which use is made of the catalysts in relation to the process (b) according to the present invention exhibit superior heat resistance and durability, and thereby is capable of suppressing to a low level, CO concentration in the objective hydrogen-containing gas as compared with Reference Example 3 in which use is made of the catalyst not containing chromium in relation to the process (b) and Reference Example 2 in which zinc/chromium ratio in the catalyst is 1.5. Thus, a reformed gas comprising hydrogen as the principal ingredient is efficiently generated in Examples 10 to 11.

<Process (c)>
{Preparation of Catalyst}
Catalyst A-3

Zinc nitrate hexahydrate in an amount of 110.80 g and 4.23 g of lead nitrate were dissolved in 500 mL of ion-exchanged water, while adjusting the temperature to 30° C. To an aqueous solution of 68.5 g of potassium carbonate dissolved in 500 mL of ion-exchanged water maintained at 30° C. under stirring was added the above-prepared aqueous solution of zinc nitrate and lead nitrate under continuous stirring for one hour to form precipitate. The precipitate thus obtained was filtered, washed with 4 liter of ion-exchanged water, subsequently dried, and thereafter calcined to obtain a zinc-lead compound. The resultant zinc-lead compound was crushed, and 13.4 g thereof was dispersed in 500 mL of ion-exchanged water to form slurry, while adjusting the temperature to 65° C. To the resultant slurry were added under stirring, an aqueous solution adjusted to a temperature to 65° C. of 3.2 g of potassium chloroplatinate dissolved in 500 mL of ion-exchanged water, and then 17 mL of 1 N aqueous solution of potassium hydroxide under stirring for one hour to form precipitate. The precipitate thus obtained was filtered, washed with 8 liter of ion-exchanged water, subsequently dried, and thereafter calcined to obtain a catalyst of Pt—Pb—ZnO having a platinum content of 10% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst A-3.

Catalyst B-3

Zinc nitrate hexahydrate in an amount of 110.80 g and 1.23 g of lead nitrate were dissolved in 1 liter of ion-exchanged water, while adjusting the temperature to 30° C. To an aqueous solution of 65.8 g of potassium carbonate dissolved in 500 mL of ion-exchanged water maintained at 30° C. under stirring was added the above-prepared aqueous solution of zinc nitrate and lead nitrate under continuous stirring for one hour to form precipitate. The precipitate thus obtained was filtered, washed with 4 liter of ion-exchanged water, subsequently dried, and thereafter calcined to obtain a zinc-lead compound. The resultant zinc-lead compound was crushed, and 14.3 g thereof was dispersed in 500 mL of ion-exchanged water to form slurry, while adjusting the temperature to 65° C. To the resultant slurry were added under stirring, an aqueous solution adjusted to a temperature to 65° C. of 3.4 g of potassium chloroplatinate dissolved in 500 mL of ion-exchanged water, and then 18 mL of 1 N aqueous solution of potassium hydroxide under stirring for one hour to form precipitate. The precipitate thus obtained was filtered, washed with 8 liter of ion-exchanged water, subsequently dried, and thereafter fired to obtain a catalyst of Pt—Pb—ZnO having a platinum content of 10% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 gL on a dry base. It was designated as Catalyst B-3.

Catalyst C-3

Crushed zinc-lead compound in an amount of 14.5 g which had been prepared in the same manner as in the Catalyst B-3 was dispersed in 500 mL of ion-exchanged water to form slurry, while adjusting the temperature to 65° C. To the resultant slurry were added under stirring, an aqueous solution adjusted to a temperature to 65° C. of 13.22 g of potassium chloroplatinate dissolved in 500 mL of ion-exchanged water, and further 65 mL of 1 N aqueous solution of potassium hydroxide under stirring for one hour to form precipitate. The precipitate thus obtained was filtered, washed with 10 liter of ion-exchanged water, subsequently dried, and thereafter calcined to obtain a catalyst of Pt—Pb—ZnO having a platinum content of 30% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst C-3.

Catalyst D-3

Bismuth nitrate pentahydrate in an amount of 1.81 g was dissolved in 100 mL of 1 N aqueous solution of nitric acid. To the resultant aqueous solution was added 110.8 g of zinc nitrate hexahydrate, which was dissolved in 500 mL of ion-exchanged water, while adjusting the temperature to 30° C. To an aqueous solution of 60 g of potassium carbonate dissolved in 500 mL of ion-exchanged water maintained at 30° C. under stirring was added the above-prepared aqueous solution of zinc nitrate and bismuth nitrate under continuous stirring for one hour to form precipitate. The precipitate thus obtained was filtered, washed with 8 liter of ion-exchanged water, subsequently dried, and thereafter calcined to obtain a zinc-bismuth compound. The resultant zinc-bismuth compound was crushed, and 17.1 g thereof was dispersed in 500 mL of ion-exchanged water to form slurry, while adjusting the temperature to 65° C. To the resultant slurry were added under stirring, an aqueous solution adjusted to a temperature to 65° C. of 4.08 g of potassium chloroplatinate dissolved in 500 mL of ion-exchanged water, and then 20 mL of 1 N aqueous solution of potassium hydroxide under stirring for one hour to form precipitate. The precipitate thus obtained was filtered, washed with 8 liter of ion-exchanged water, subsequently dried, and thereafter calcined to obtain a catalyst of Pt—Bi—ZnO having a platinum content of 10% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst D-3.

Catalyst E-3

Bismuth nitrate pentahydrate in an amount of 1.1 g was dissolved in 60 mL of 1 N aqueous solution of nitric acid. To the resultant aqueous solution was added 67.9 g of zinc nitrate hexahydrate, which was dissolved in 500 mL of ion-exchanged water, while adjusting the temperature to 30° C. To an aqueous solution of 33.3 g of potassium carbonate dissolved in 500 mL of ion-exchanged water maintained at 30° C. under stirring was added the above-prepared acidic aqueous solution of zinc nitrate and bismuth nitrate under continuous stirring for one hour to form precipitate. The precipitate thus obtained was filtered, washed with 8 liter of ion-exchanged water, subsequently dried, and thereafter calcined to obtain a zinc-bismuth compound. The resultant zinc-bismuth compound was crushed, and was dispersed in 500 mL of ion-exchanged water to form slurry, while adjusting the temperature to 65° C. To the resultant slurry were added under stirring, an aqueous solution adjusted to a temperature to 65° C. of 18.2 g of potassium chloroplatinate dissolved in 500 mL of ion-exchanged water, and then 87.9 mL of 1 N aqueous solution of potassium hydroxide under stirring for one hour to form precipitate. The precipitate thus obtained was filtered, washed with 8 liter of ion-exchanged water, subsequently dried, and thereafter calcined to obtain a catalyst of Pt—Bi—ZnO having a platinum content of 30% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst E-3.

Catalyst F-3

To 500 mL of aqueous dispersion at 60° C. incorporated with 15 g of powdery zinc oxide were added 500 mL of an aqueous solution at 60° C. of 13.82 g of potassium chloroplatinate ($K_2PtCl_4$) and after 30 minutes, 66 mL of 1 N aqueous solution of KOH, while stirring for 60 minutes.

Thereafter the resultant mixture was filtered, and washed with water repeatedly until the concentration of chlorine in the filtrate became 1 ppm or lower. Subsequently the washed cake was dried for 15 hours at a temperature of 80° C., and then was calcined at 380° C. for 2 hours in air to obtain a catalyst of Pt—ZnO. Then 7.5 g of the calcined powder was pulverized by means of a ball mill, and dispersed in 250 mL of water. To the dispersion thus prepared were added 250 mL of aqueous solution of 0.097 g of indium nitrate trihydrate and after 15 minutes, 0.54 mL of 1 N aqueous solution of KOH, while stirring for 30 minutes. The mixture just prepared was dried at 80° C. for 15 hours, and calcined at 380° C. for 2 hours in air to obtain a catalyst of Pt—In—ZnO having a platinum content of 30% by weight and an indium oxide content of 0.5% by weight.

The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst F-3.

Catalyst G-3

In the same manner as in the Catalyst F-3, there was prepared a catalyst of Pt—In—ZnO having a platinum content of 30% by weight and an indium oxide content of 1% by weight.

The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst G-3.

Catalyst H-3

Zinc oxide in an amount of 15 g was dispersed in 500 mL of ion-exchanged water, while adjusting the temperature of the dispersion to 65° C. To the resultant dispersion were added under stirring, an aqueous solution adjusted to 65° C. of 3.55 g of potassium chloroplatinate ($K_2PtCl_4$) dissolved in 500 mL of ion-exchanged water and 18 mL of 1 N aqueous solution of potassium hydroxide, followed by continuous stirring for one hour to form precipitate. The resultant precipitate was filtered, and washed with 8 liter of ion-exchanged water, subsequently dried, and calcined to obtain a catalyst of Pt—ZnO having a platinum content of 10% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst H-3.

Catalyst I-3

Zinc oxide in an amount of 15 g was dispersed in 500 mL of ion-exchanged water, while adjusting the temperature of the dispersion to 65° C. To the resultant dispersion were added under stirring, an aqueous solution adjusted to 65° C. of 13.68 g of potassium chloroplatinate ($K_2PtCl_4$) dissolved in 500 mL of ion-exchanged water and 70 mL of 1 N aqueous solution of potassium hydroxide, followed by continuous stirring for one hour to form precipitate. The resultant precipitate was filtered, and washed with 10 liter of ion-exchanged water, subsequently dried, and calcined to obtain a catalyst of Pt—ZnO having a platinum content of 30% by weight. The resultant catalyst was wet milled, mixed with alumina sol to be made into slurry. Subsequently there were repeated the steps of immersing a cordierite-made honeycomb (400 cells/square inch) into the slurried catalyst, blowing off an excess amount thereof and drying the same, so that the catalyst was supported thereon in a catalyst amount of 200 g/L on a dry base. It was designated as Catalyst I-3.

{Reforming Reaction}

EXAMPLES 12 TO 14

A reactor was packed with the Catalyst A-3 or B-3. Prior to evaluation of the activity thereof, an aqueous solution of methanol having a water/methanol ratio of 1.5 was introduced in an evaporator, where each of the catalysts was subjected to reduction treatment at a methanol LHSV of 15 $hr^{-1}$ at 200° C. Air was mixed in evaporated water/methanol on the downstream side of the evaporator outlet, and the temperature in the introduction line leading to a catalyst bed was regulated so that the mixed gas of water/methanol was charged therein at 200° C. The reaction of water/methanol was controlled with an air rate so as to achieve a catalyst bed inlet temperature of 400° C. The chemical composition of the gas after the reaction was analyzed by means of gas chromatography. The methanol conversion and selectivity to CO are given in Table 8 and Table 9, respectively.

EXAMPLE 15

A reactor was packed with the Catalyst D-2. Prior to evaluation of the activity thereof, an aqueous solution of methanol having a water/methanol ratio of 1.5 was introduced in an evaporator, where the catalyst was subjected to reduction treatment at a methanol LHSV of 15 $hr^{-1}$ at 200° C. Air was mixed in evaporated water/methanol on the downstream side of the evaporator outlet, and the temperature in the introduction line to a catalyst bed was regulated so that the mixed gas of water/methanol was charged therein at 200° C. The reaction of water/methanol was controlled with an air rate so as to achieve a catalyst bed inlet temperature of 400° C. The chemical composition of the gas after the reaction was analyzed by means of gas chromatography. The methanol conversion and selectivity to CO are given in Table 8 and Table 9, respectively.

EXAMPLE 16

The procedure in Example 15 was repeated to effect the reduction treatment, reaction and analysis except that the Catalyst E was packed in a reactor and a methanol LHSV was set on 30 $hr^{-1}$. The methanol conversion and selectivity to CO are given in Table 8 and Table 9, respectively.

EXAMPLES 17 TO 18

The procedure in Example 12 was repeated to effect the reduction treatment, reaction and analysis except that the Catalyst F-3 or G-3 was packed in a reactor. The methanol conversion and selectivity to CO are given in Table 8 and Table 9, respectively.

REFERENCE EXAMPLES 4 TO 5

The procedure in Example 12 was repeated to effect the reduction treatment, reaction and analysis except that the Catalyst H-3 or I-3 was packed in a reactor. The methanol conversion and selectivity to CO are given in Table 8 and Table 9, respectively.

TABLE 8

| Reaction time (hr) Catalyst | 0 | 50 | 100 |
|---|---|---|---|
| | Reactivity of methanol (mol %) | | |
| Example 12  A-3 | 91.9 | 88.5 | 85.3 |
| Example 13  B-3 | 95.1 | 92.9 | 90.4 |
| Example 14  C-3 | 98.0 | 97.8 | 97.7 |
| Example 15  D-3 | 94.9 | 94.2 | 93.2 |
| Example 16  E-3 | 99.4 | 99.5 | 99.5 |
| Example 17  F-3 | 99.4 | 99.2 | 99.2 |
| Example 18  G-3 | 99.4 | 99.3 | 98.9 |
| Reference Example 4  H-3 | 99.7 | 99.8 | 99.7 |
| Reference Example 5  I-3 | 99.7 | 99.6 | 99.6 |

TABLE 9

| Reaction time (hr) Catalyst | 0 | 50 | 100 |
|---|---|---|---|
| | Selectivity to Carbon Monoxide (%) | | |
| Example 12  A-3 | 4.5 | 6.3 | 8.5 |
| Example 13  B-3 | 8.3 | 9.5 | 10.8 |
| Example 14  C-3 | 5.9 | 5.8 | 5.8 |
| Example 15  D-3 | 9.7 | 6.5 | 4.9 |
| Example 16  E-3 | 11.0 | 7.4 | 6.8 |
| Example 17  F-3 | 9.0 | 9.1 | 9.2 |
| Example 18  G-3 | 8.3 | 8.8 | 9.5 |
| Reference Example 4  H-3 | 14.2 | 12.6 | 12.7 |
| Reference Example 5  I-3 | 11.5 | 9.3 | 9.4 |

What is claimed is:

1. A process for producing a hydrogen-containing gas, which comprises reacting methanol, steam and oxygen in the presence of a catalyst consisting essentially of platinum and zinc oxide, wherein the content of the platinum is in the range of 5 to 50% by weight based on the total amount of the platinum and zinc oxide.

2. The process for producing a hydrogen-containing gas according to claim 1, wherein methanol, steam and oxygen are reacted at a molar ratio of steam to methanol in the range of 1 to 10 and at a molar ratio of air to methanol in the range of 0.3 to 5.

3. The process for producing a hydrogen-containing gas according to claim 1, wherein use is made of a catalyst in which catalyst ingredients are supported on a carrier or a carrier structure.

4. The process for producing a hydrogen-containing gas according to claim 1, wherein use is made of an auto thermal reaction reactor.

5. The process for producing a hydrogen-containing gas according to claim 1, wherein said content of the platinum is 20 to 30% by weight based on the total amount of the platinum and the zinc oxide.

6. The process for producing a hydrogen-containing gas according to claim 1, wherein the content of the platinum is in the range of 20 to 50% by weight based on the total amount of the platinum and zinc oxide.

7. A process for producing a hydrogen-containing gas, which comprises reacting methanol, steam and oxygen in the presence of a catalyst consisting essentially of platinum, zinc oxide and chromium oxide, wherein the content of the platinum is in the range of 5 to 50% by weight based on the total amount of the platinum and zinc oxide, and wherein the atomic ratio of zinc to chromium (zinc/chromium) is in the range of 2 to 30.

8. The process for producing a hydrogen-containing gas according to claim 7, wherein the atomic ratio of zinc to chromium is in the range of 2.3 to 10.

9. The process for producing a hydrogen-containing gas according to claim 7, wherein the content of the platinum is in the range of 20 to 50% by weight based on the total amount of the platinum, zinc oxide and chromium oxide.

10. The process for producing a hydrogen-containing gas according to claim 7, wherein methanol, steam and oxygen are reacted at a molar ratio of steam to methanol in the range of 1 to 10 and at a molar ratio of air to methanol in the range of 0.3 to 5.

11. The process for producing a hydrogen-containing gas according to claim 7, wherein use is made of a catalyst in which catalyst ingredients are supported on a carrier structure.

12. The process for producing a hydrogen-containing gas according to claim 7, wherein use is made of an auto thermal reaction reactor.

13. A process for producing a hydrogen-containing gas, which comprises reacting methanol, steam and oxygen in the presence of a catalyst comprising platinum, zinc oxide and at least one element selected from the group consisting of lead, bismuth and indium, wherein the content of the platinum is in the range of 5 to 50% by weight based on the total amount of the platinum and the zinc oxide.

14. The process for producing a hydrogen-containing gas according to claim 13, wherein where lead is included, the lead is included in an amount of 0.01 to 3.5%; where bismuth is included, the bismuth is included in an amount of 0.01 to 10%; and where indium is included, the indium is included in an amount of 0.01 to 5%, in number of atoms contained in the catalyst based on the total number of atoms of oxygen and metals constituting the catalyst.

15. The process for producing a hydrogen-containing gas according to claim 14, wherein where lead is included, the amount thereof is 0.02 to 2%; where bismuth is included, the amount is 0.05 to 4%, and where indium is included, the amount is 0.02 to 2%, in number of atoms contained in the catalyst based on the total number of atoms of oxygen and metals constituting the catalyst.

16. The process for producing a hydrogen-containing gas according to claim 13, wherein methanol, steam and oxygen are reacted at a molar ratio of steam to methanol in the range of 1 to 10 and at a molar ratio of air to methanol in the range of 0.3 to 5.

17. The process for producing a hydrogen-containing gas according to claim 13, wherein use is made of a catalyst in which catalyst ingredients are supported on a carrier structure.

18. The process for producing a hydrogen-containing gas according to claim 13, wherein use is made of an auto thermal reaction reactor.

* * * * *